United States Patent [19]

Sasaya

[11] Patent Number: 5,402,291
[45] Date of Patent: Mar. 28, 1995

[54] ROTARY HEAD DRUM ARRANGEMENT INCLUDING A DUMMY ERASE HEAD

[75] Inventor: Takashi Sasaya, Kanagawa, Japan
[73] Assignee: Sony Corporation, Tokyo, Japan
[21] Appl. No.: 804,393
[22] Filed: Dec. 10, 1991

[30] Foreign Application Priority Data

Dec. 14, 1990 [JP] Japan .................... 2-410775

[51] Int. Cl.$^6$ ............................................. G11B 5/53
[52] U.S. Cl. .................................................... 360/107
[58] Field of Search .................... 360/130.21, 130.22, 360/130.23, 130.24, 84, 107, 118

[56] References Cited

U.S. PATENT DOCUMENTS

| | | | |
|---|---|---|---|
| 4,839,750 | 6/1989 | Kato et al. | 360/32 |
| 5,130,875 | 5/1992 | Ono et al. | 360/107 |

FOREIGN PATENT DOCUMENTS

| | | |
|---|---|---|
| 55-42349 | 3/1980 | Japan . |
| 57-179910 | 11/1982 | Japan . |
| 59-154893 | 9/1984 | Japan . |
| 266622 | 11/1988 | Japan . |
| 01-256002 | 10/1989 | Japan . |
| 3178024 | 8/1991 | Japan . |

Primary Examiner—Stuart S. Levy
Assistant Examiner—Paul J. Ditmyer
Attorney, Agent, or Firm—William S. Frommer; Alvin Sinderbrand

[57] ABSTRACT

A rotary head drum arrangement which can provide, upon reproduction, an equivalent influence of an impact error at a position of a recording track at which it is influenced by an impact error upon recording. The rotary head drum arrangement comprises a rotary drum, a video recording head pair including a pair of video recording heads, an erasing head pair including an erasing head and a dummy head, an audio recording and reproducing head pair including a pair of audio recording and reproducing heads and a video reproducing head pair including a pair of video reproducing heads. The video recording head pair, erasing head pair, audio recording and reproducing head pair and video reproducing head pair are disposed in an angularly equidistantly spaced relationship from each other on an outer periphery of the rotary drum while the heads thereof are spaced by an equal angular distance from each other.

7 Claims, 4 Drawing Sheets

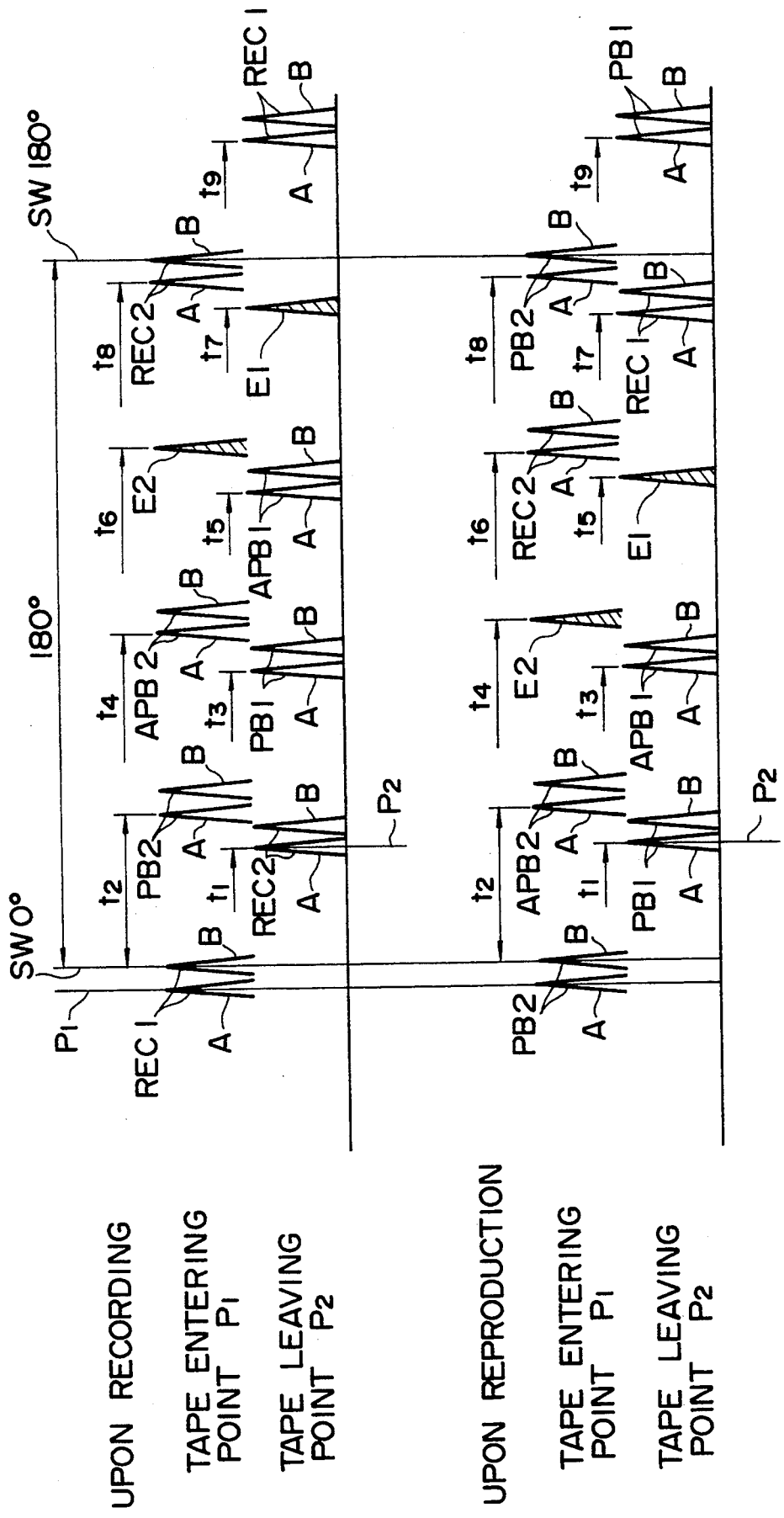

ROTARY HEAD DRUM ARRANGEMENT INCLUDING A DUMMY ERASE HEAD

BACKGROUND OF THE INVENTION

1. Field of the Invention

This invention relates to a rotary head drum arrangement of the helical scanning type which is applied most suitably, for example, to a video tape recorder for a broadcasting station.

2. Description of the Prior Art

A rotary head drum arrangement of the helical scanning type applied to a video tape recorder for a broadcasting station is already known and disclosed, for example, in Japanese Patent Laid-Open Application No. 58-6547.

An exemplary one of such conventional rotary head drum arrangements is shown in FIG. 3. Referring to FIG. 3, the conventional rotary head drum arrangement includes a rotary drum D, and a pair of first video recording heads (called paired heads) A REC1 and B REC1, a single first erasing head E1, a pair of first audio recording and reproducing heads A APB1 and B APB1, a pair of first video reproducing heads A PB1 and B PB1, a pair of second video recording heads A REC2 and B REC2, a single second erasing head E2, a pair of second audio recording and reproducing heads A APB2 and B APB2, and a pair of second video reproducing heads A PB2 and B PB2 arranged in an angularly equidistantly spaced relationship by an angle of 45 degrees from each other on an outer periphery of the rotary drum D. The pair heads in each head pair are spaced by an angular distance of 6 degrees from each other.

The rotary drum D is rotated at a high speed in the direction indicated by an arrow mark a, and during such rotation of the rotary drum D, the heads thereon helically scan a magnetic tape T wound helically on the rotary drum D and a fixed drum (not shown) to effect recording or reproduction of a desired image and/or a desired sound.

With a rotary head drum arrangement of the type described above, where a tape entering point (point at which a head is brought into contact with the magnetic tape) of the rotary drum D is represented by P1: a tape leaving point (point at which the head is brought out of contact with the magnetic tape) of the rotary drum D is represented by P2; a starting point (switching position) of recording or reproduction is represented by SW0°: and an ending point (switching position) of recording or reproduction is represented by SW180° as shown in FIG. 3, when a video signal is to be written, upon recording, onto the magnetic tape T over an angle of 180 degrees of the rotary drum D, seven velocity errors (phase errors) are produced, at each of the tape entering point P1 and tape leaving point P2, on a recording track influenced by an impact error due to hitting of heads upon the magnetic tape T in the order in time of t1 to t9 as seen from FIG. 4.

Here, in the conventional rotary head drum arrangement, each of the heads REC1, REC2, PB1, PB2, APB1 and APB2 is constructed from a pair of heads, that is, pair heads A and B while each of the erasing heads E1 and E2 is constructed from a single head.

Accordingly, the phase of hitting of the erasing head E1 or E2 upon the magnetic head T does not match with the phase of hitting of any of the pair heads between upon recording and upon reproduction as seen from FIG. 4. Since the velocity of propagation of an impact error is higher than the relative velocity of the heads, the conventional rotary head drum arrangement has a problem that a time base error on a reproduction signal is so great as to produce a great impact error in a reproduction output so that a deformation or color irregularity takes place with a reproduction screen.

SUMMARY OF THE INVENTION

It is an object of the present invention to provide a rotary head drum arrangement which can provide, upon reproduction, an equivalent influence of an impact error at a position of a recording track at which it is influenced by an impact error upon recording.

In order to attain the object, according to one aspect of the present invention, there is provided a rotary head drum arrangement, which comprises a rotary drum, a video recording head pair including a pair of video recording heads, an erasing head pair including an erasing head and a dummy head, an audio recording and reproducing head pair including a pair of audio recording and reproducing heads and a video reproducing head pair including a pair of video reproducing heads, the video recording head pair, erasing head pair, audio recording and reproducing head pair and video reproducing head pair being disposed in an angularly equidistantly spaced relationship from each other on an outer periphery of the rotary drum while the heads thereof are spaced by an equal angular distance from each other.

With the rotary head drum arrangement, all of the heads on the outer periphery of the rotary drum are formed as head pairs each including a pair of heads and are disposed in an angularly equidistantly spaced relationship from each other. Accordingly, an equivalent influence of an impact error can be provided, upon reproduction, at a position of a recording track at which it is influenced by an impact error upon recording so that the influence of the impact error upon recording can be offset upon reproduction. Consequently, a time base error on a reproduction signal can be minimized to minimize an impact error in a reproduction output, and accordingly, a deformation or color irregularity of a reproduction screen can be prevented or minimized.

According to another aspect of the present invention, there is provided a rotary head drum arrangement, which comprises a rotary drum, a first video recording head pair including a pair of video recording heads, a first erasing head pair including an erasing head and a dummy head, a first audio recording and reproducing head pair including a pair of audio recording and reproducing heads, a first video reproducing head pair including a pair of video reproducing heads, a second video recording head pair including a pair of video recording heads, a second erasing head pair including an erasing head and a dummy head, a second audio recording and reproducing head pair including a pair of audio recording and reproducing heads and a second video reproducing head pair including a pair of video reproducing heads, the first video recording head pair, first erasing head pair, first audio recording and reproducing head pair, first video reproducing head pair, second video recording head pair, second erasing head pair, second audio recording and reproducing head pair and second video reproducing head pair being disposed in an angularly equidistantly spaced relationship from each other on an outer periphery of the rotary drum while the heads thereof are spaced by an equal angular distance from each other.

Also with the rotary head drum arrangement, all of the heads on the outer periphery of the rotary drum are formed as head pairs each including a pair of heads and are disposed in an angularly equidistantly spaced relationship from each other. Accordingly, an equivalent influence of an impact error can be provided, upon reproduction, at a position of a recording track at which it is influenced by an impact error upon recording so that the influence of the impact error upon recording can be offset upon reproduction. Consequently, a time base error on a reproduction signal can be minimized to minimize an impact error in a reproduction output, and accordingly, a deformation or color irregularity of a reproduction screen can be prevented or minimized.

According to a further aspect of the present invention, there is provided a rotary head drum arrangement, which comprises a rotary drum, a recording head set disposed on an outer periphery of the rotary drum and including a plurality of recording heads for recording a signal in accordance with the helical scanning system onto a record medium in the form of a tape wrapped around and fed along the rotary drum, a reproducing head set disposed on the outer periphery of the rotary drum and including the same plural number of reproducing heads as the number of the recording heads for reproducing the signal recorded on such record medium in accordance with the helical scanning system, and an erasing head set disposed on the outer periphery of the rotary head and including an erasing head for erasing record tracks on the record medium formed by the recording heads and a dummy head disposed so as to produce an impact error equivalent to an impact error produced by any of the recording heads and reproducing heads, the recording head set, reproducing head set and erasing head set being disposed such that positions of impact errors produced on the record tracks by the heads of the head sets upon reproduction of a signal are same as positions of impact errors produced on the record tracks by the heads of the head sets upon reproduction of the recorded signal.

Also with the rotary head drum arrangement, all of the heads on the outer periphery of the rotary drum are formed as head sets each including a same plural number of heads and are disposed such that positions of impact errors produced on the record tracks by the heads of the head sets upon reproduction of a signal are same as positions of impact errors produced on the record tracks by the heads of the head sets upon reproduction of the recorded signal. Accordingly, an equivalent influence of an impact error can be provided, upon reproduction, at a position of a recording track at which it is influenced by an impact error upon recording so that the influence of the impact error upon recording can be offset upon reproduction. Consequently, a time base error on a reproduction signal can be minimized to minimize an impact error in a reproduction output, and accordingly, a deformation or color irregularity of a reproduction screen can be prevented or minimized.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a waveform diagram illustrating phases of impact errors produced with the conventional rotary head drum arrangement of FIG. 3 upon recording and reproduction.

DETAILED DESCRIPTION OF THE PREFERRED EMBODIMENT

Figure 1:
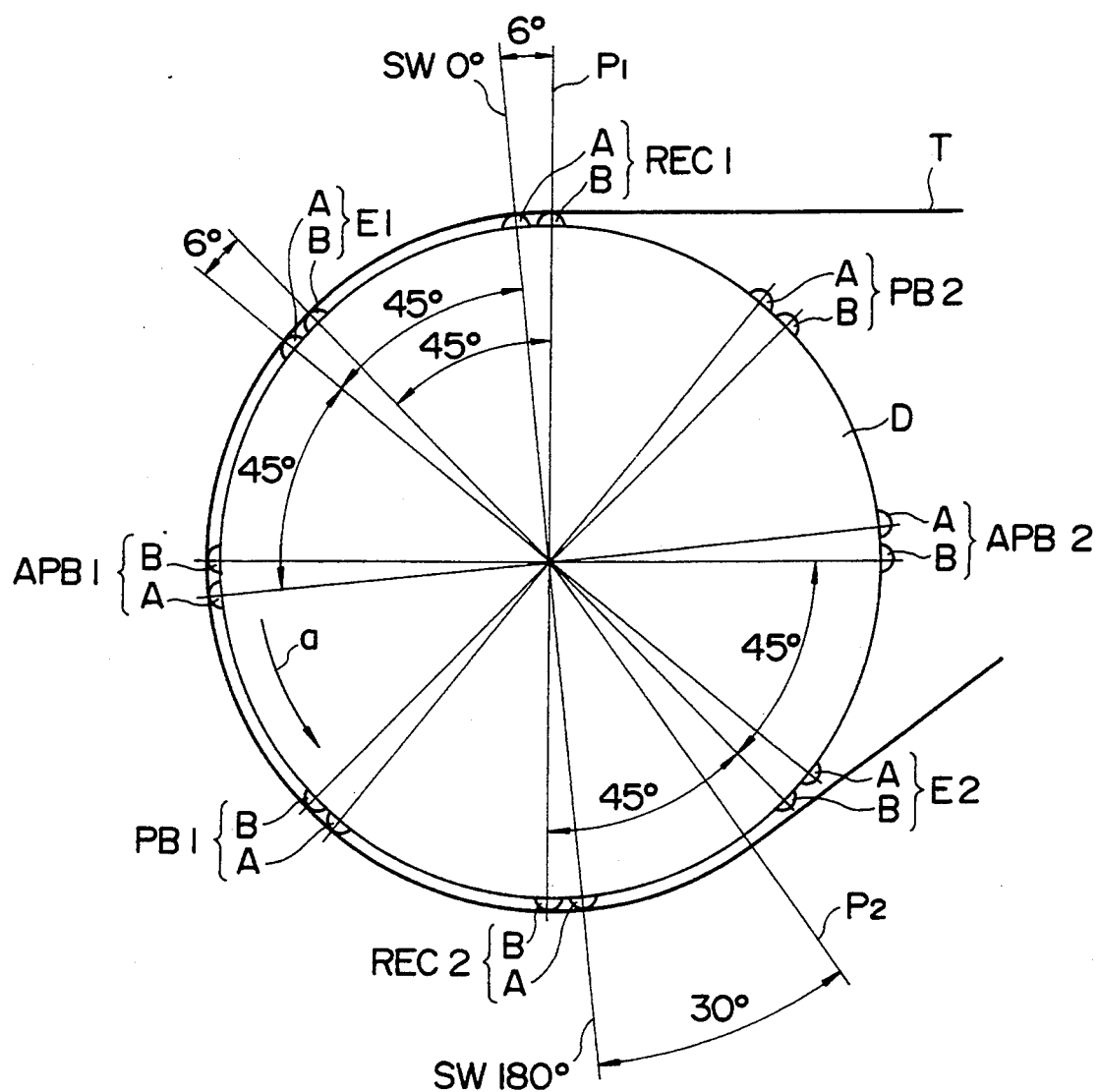
FIG. 1 is a plan view of a rotary head drum arrangement showing a preferred embodiment of the present invention.

Referring to FIG. 1, there is shown a rotary head drum arrangement to which the present invention is applied. The rotary head drum arrangement shown includes a rotary drum D, and a pair of first video recording heads A REC1 and B REC1, a pair of first erasing heads A E1 and B E1, a pair of first audio recording and reproducing heads A APB1 and B APB1, a pair of first video reproducing heads A PB1 and B PB1, a pair of second video recording heads A REC2 and B REC2, a pair of second erasing heads A E2 and BE2, a pair of second audio recording and reproducing heads A APB2 and B APB2, and a pair of second video reproducing heads A PB2 and B PB2 arranged in an angularly equidistantly spaced relationship by an angle of 45 degrees from each other on an outer periphery of the rotary drum D. The pair heads in each head pair are spaced by an angular distance of 6 degrees from each other.

Figure 3:
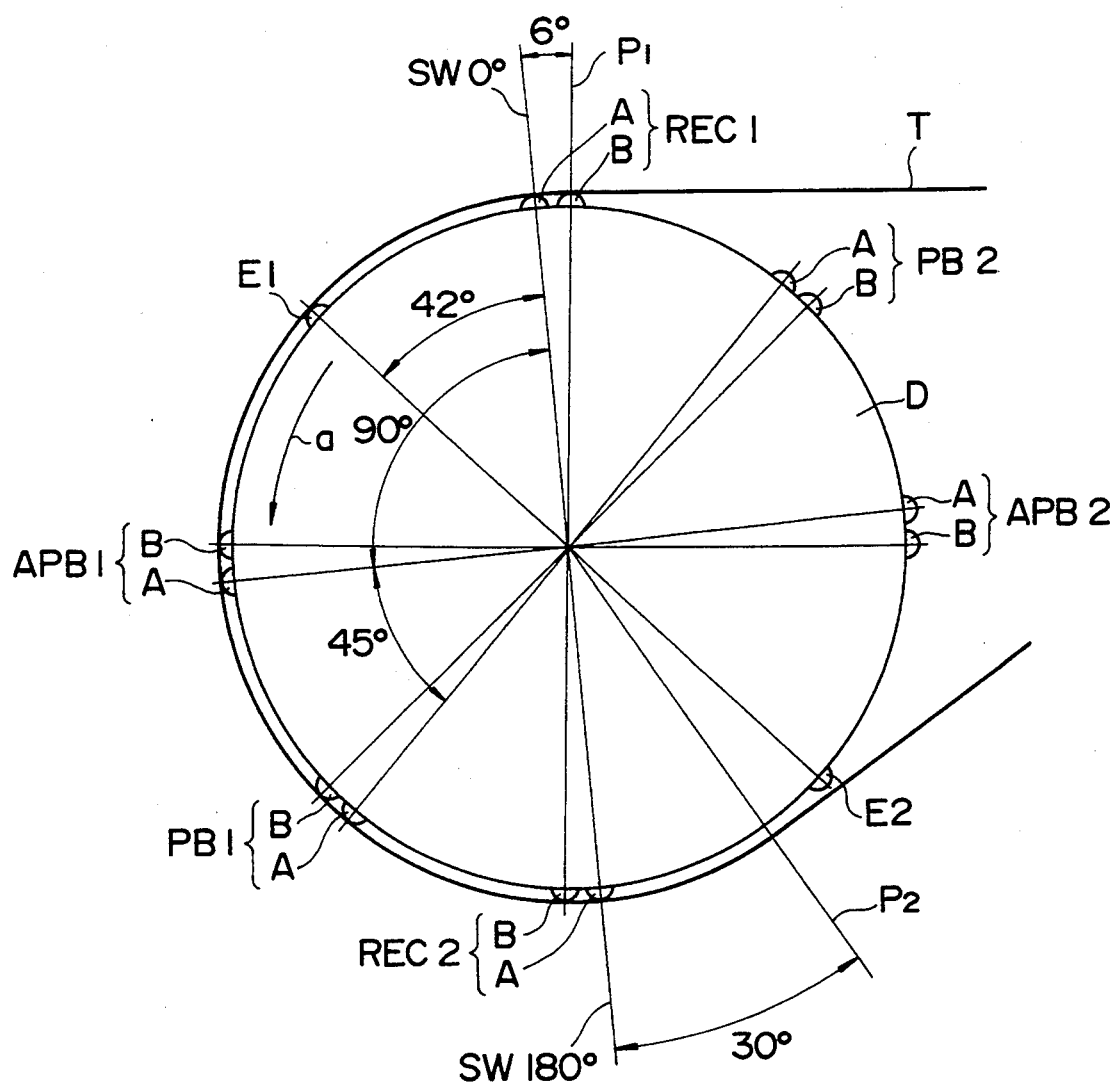
FIG. 3 is a plan view showing a conventional rotary head drum arrangement.

Thus, the rotary head drum arrangement is different from the conventional rotary head drum arrangement shown in FIG. 3 in that it includes, in place of the single erasing heads E1 and E2, the first and second erasing head pairs E1 and E2, respectively, each constructed from a pair of heads A and B. The heads A of the first and second erasing head pairs E1 and E2 serve as dummy heads while the other heads B serve as erasing heads. The heads A and B of each of the first and second erasing head pairs E1 and E2 are spaced by an angular distance of 6 degrees from each other as in the other head pairs. Further, the heads A and B of the first erasing head pair E1 are spaced by an angular distance of 45 degrees from the heads A and B of the adjacent first video recording head pair REC1 and also from the heads A and B of the adjacent first audio recording and reproducing head pair APB1, respectively, and also the heads A and B of the second erasing head pair E2 are spaced by an angular distance of 45 degrees from the heads A and B of the adjacent second video recording head pair REC2 and also from the heads A and B of the adjacent second audio recording and reproducing head pair APB2, respectively, similarly to the heads A and B of any other head pair.

Figure 2:
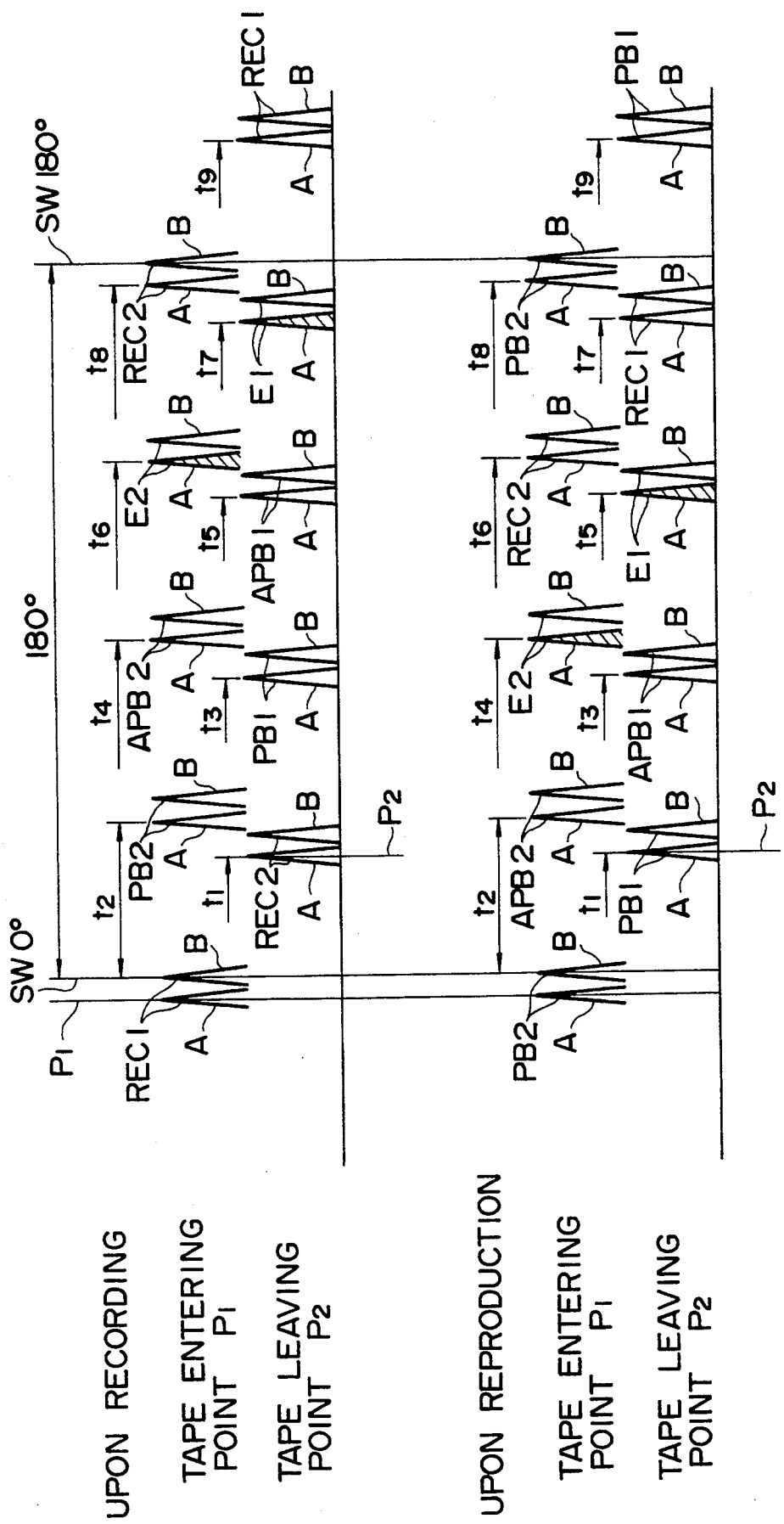
FIG. 2 is a waveform diagram illustrating phases of impact errors produced with the rotary head drum arrangement of FIG. 1 upon recording and reproduction.

According to the rotary head drum arrangement, when a video signal is to be written upon recording onto a magnetic tape T over an angle of 180 degrees of the rotary drum D, eight velocity errors (phase errors) are produced, at each of a tape entering point P1 and a tape leaving point P2 of the drum D, on a recording truck influenced by an impact error due to hitting of heads upon the magnetic tape T in the order in time of t1 to t9 as seen from FIG. 2.

Then, also upon reproduction, similar velocity errors (phase errors) are produced. In this instance, the phases of such errors substantially coincide with those upon recording.

Accordingly, an equivalent influence of an impact error can be had, upon reproduction, at a position of a recording track at which it is influenced by an impact error upon recording, and only a portion which has been recorded at a high speed onto the recording track due to an impact error can be reproduced at such high speed due to an impact error.

As a result, an influence of an impact error upon recording can be offset upon reproduction, and consequently, a time base error on a reproduction signal can be offset and minimized to minimize an impact error in a reproduction output. Accordingly, a deformation or color irregularity of a reproduction screen can be prevented or minimized.

Having now fully described the invention, it will be apparent to one of ordinary skill in the art that many changes and modifications can be made thereto without departing from the spirit and scope of the invention as set forth herein.

What is claimed is:

1. A rotary head drum arrangement including a dummy erase head, comprising:
    a rotary drum having an outer periphery,
    a video recording head pair including a pair of video recording heads,
    an erasing head pair including an erasing head and a dummy head,
    an audio recording and reproducing head pair including a pair of audio recording and reproducing heads, and
    a video reproducing head pair including a pair of video reproducing heads,
    adjacent pairs of the video recording head pair, the erasing head pair, the audio recording and reproducing head pair and the video reproducing head pair being angularly spaced from each other by a first equal angular distance on an arc of the outer periphery of the rotary drum and the heads in each pair being spaced from each other by a second equal angular distance.

2. The rotary head drum arrangement according to claim 1, wherein said first equal angular distance is 45 degrees and said second equal angular distance is 6 degrees.

3. A rotary head drum arrangement including a dummy erase head, comprising:
    a rotary drum having an outer periphery,
    a first video recording head pair including a pair of video recording heads,
    a first erasing head pair including an erasing head and a dummy head,
    a first audio recording and reproducing head pair including a pair of audio recording and reproducing heads,
    a first video reproducing head pair including a pair of video reproducing heads,
    a second video recording head pair including a pair of video recording heads,
    a second erasing head pair including an erasing head and a dummy head,
    a second audio recording and reproducing head pair including a pair of audio recording and reproducing heads, and
    a second video reproducing head pair including a pair of video reproducing heads,
    the first video recording head pair, the first erasing head pair, the first audio recording and reproducing head pair, the first video reproducing head pair, the second video recording head pair, the second erasing head pair, the second audio recording and reproducing head pair and the second video reproducing head pair being angularly spaced from each other by a first equal angular distance on the outer periphery of the rotary drum and the heads in each pair being spaced from each other by a second equal angular distance.

4. The rotary head drum arrangement according to claim 3, wherein, said first equal angular distance is 45 degrees and said second equal angular distance is 6 degrees.

5. A rotary head drum arrangement including a dummy erase head, comprising:
    a rotary drum having an outer periphery,
    a recording head set disposed on the outer periphery of the rotary drum and including a plurality of recording heads for recording a signal in accordance with a helical scanning system onto a tape wrapped around and fed along the rotary drum,
    a reproducing head set disposed on the outer periphery of the rotary drum and including a plurality of reproducing heads equal to the number of the recording heads for reproducing the signal recorded on the tape in accordance with the helical scanning system, and
    an erasing head set disposed on the outer periphery of the rotary drum and including an erasing head for erasing record tracks on the tape and a dummy head disposed so that said erasing head set produces an impact error equivalent to an impact error produced by any of the recording head sets and the reproducing head sets, the recording head set, the reproducing head set and the erasing head set being disposed on the outer periphery of the rotary drum such that positions of impact errors produced on the record tracks by the heads of the head sets upon recording the signal are the same as positions of impact errors produced on the record tracks by the heads of the head sets upon reproduction of the signal.

6. The rotary head drum arrangement according to claim 5, wherein said rotary head drum arrangement comprises a pair of said recording head sets, a pair of said reproducing head sets and a pair of said erasing head sets disposed on the outer periphery of said rotary drum such that the head sets in each pair are angularly spaced by 180 degrees from each other and said recording head sets, said reproducing head sets and said erasing head sets are equal spaced from each other.

7. The rotary head drum arrangement according to claim 6, wherein said recording heads and said reproducing heads are provided for recording and reproducing a video signal, respectively, and further comprising a pair of audio signal recording and reproducing head sets angularly spaced by 180 degrees from each other on the outer periphery of said rotary drum and including a plurality of audio signal recording and reproducing heads for recording and reproducing an audio signal, the plurality of audio signal recording and reproducing heads being equal to the number of said recording heads, said recording head sets, said reproducing head sets, said erasing head sets and said audio signal recording and reproducing head sets being equally spaced from each other on the outer periphery of said rotary drum.

* * * * *